United States Patent
Barnes

(10) Patent No.: US 8,543,636 B1
(45) Date of Patent: Sep. 24, 2013

(54) SYSTEM MIGRATION USING HARDWARE VIRTUALIZATION

(75) Inventor: James D. Barnes, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 2165 days.

(21) Appl. No.: 11/097,781

(22) Filed: Apr. 1, 2005

(51) Int. Cl.
*G06F 15/16* (2006.01)

(52) U.S. Cl.
USPC .......... 709/201; 709/213; 709/217; 709/218; 709/219

(58) Field of Classification Search
USPC ................. 709/201, 213, 217–219
See application file for complete search history.

(56) References Cited

U.S. PATENT DOCUMENTS

| | | | |
|---|---|---|---|
| 6,075,938 A * | 6/2000 | Bugnion et al. | 703/27 |
| 6,848,106 B1 * | 1/2005 | Hipp | 719/312 |
| 6,944,785 B2 * | 9/2005 | Gadir et al. | 714/4 |
| 7,133,984 B1 * | 11/2006 | Dickensheets | 711/162 |
| 7,257,811 B2 * | 8/2007 | Hunt et al. | 718/1 |
| 2002/0166117 A1 * | 11/2002 | Abrams et al. | 717/177 |
| 2005/0044301 A1 * | 2/2005 | Vasilevsky et al. | 711/1 |
| 2006/0010176 A1 * | 1/2006 | Armington | 707/204 |

OTHER PUBLICATIONS

Barnes, System and Method for Software Failover on a Bladed System, filed Sep. 28, 2004, U.S. Appl. No. 10/952,405, 22 pgs., drawings (2 sheets).

Egenera, "Advantages of Running Oracle9i Database with Real Application Clusters on the Egenera BladeFrame," White Paper, 2002, 6 pgs.
Egenera, "BladeFrame: Utility Computing through Datacenter Virtualization," 2001, 12 pgs.
Egenera, "Emerging Server Architectures," White Paper, 2001, 13 pgs.
Egenera, "Improving Datacenter Performance," White Paper, 2001, 19 pgs.
Egenera, "The Egenera Processing Area Network (PAN) Architecture," White Paper, 2002, 21 pgs.
"Egenera, Inc. Announces Commercial Availability of BladeFrame Release 1.1," Supercomputing Online.com, http://supercomputingonline.com/print.php?sid=702, Sep. 24, 2004, 5 pgs.
Gartner, Inc., "Egenera BladeFrame System," Product Report, Apr. 1, 2004, 10 pgs.
Intel, Corp., Egenera, "Modular Computing: The New Enterprise Computing Model," White Paper, Cross Industry, 2003, 12 pgs.
Sybase, "Adaptive Server Enterprise on Egenera BladeFrame Platform," White Paper, Jan. 2003, 10 pgs.

* cited by examiner

*Primary Examiner* — Boris Gorney

(57) ABSTRACT

A system is provided for migration of an application between processing servers in a virtual server. The system includes a first processing server, a second processing server, at least one disk for storage, at least one network interface, a control server and an agent. The control server is operable to combine the first processing server with the network interface and disk into the virtual server to operate an application. The agent is coupled to the control server to promote capture from the first processing server of application state information related to execution of the application by the first processing server. The agent further promotes transfer of at least some of the captured application state information to the second processing server to enable the second processing server to execute the application using the at least some of the captured application state information.

20 Claims, 3 Drawing Sheets

SYSTEM MIGRATION USING HARDWARE VIRTUALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to virtualization and network server technology. More specifically, but not by way of limitation, a method and a system are provided that allow the migration of a computing system using hardware virtualization.

BACKGROUND OF THE INVENTION

Information technology (IT) managers face a number of challenges as they are increasingly pushed to improve service delivery while lowering operational costs. These challenges include decreasing "server sprawl", improving system utilization, reducing system management complexity, and improving the flexibility of IT resources. To address these challenges, many IT organizations are implementing some form of hardware virtualization or server virtualization.

Conventional servers consist of three major components: a central processing unit and its associated temporary data storage, a data storage unit for long-term data retention, and an interface to a network. In a conventional server, these three components are physically connected to each other in a single device.

Hardware virtualization allows virtual servers to be built by combining various components indirectly through a control server or computing fabric. The components in a virtual server typically include a stateless server consisting of a central processing unit and its associated temporary data storage, a data storage unit for long-term data retention, and an interface to a network. These components will be referred to herein as the processing server, the disk, and the network interface, respectively.

To create a virtual server, appropriate components for a desired server configuration are chosen from a pool of processing servers, a pool of disks, and a pool of network interfaces. The selected components are connected to the control server rather than directly to each other. Software in the control server keeps track of which components are connected in this manner and handles communication among the components. The software might also allow an administrator to remotely monitor and control a virtual server using either a command line interface or a browser-based graphical user interface. Multiple virtual servers can be built on a single control server.

Hardware virtualization improves the flexibility of server systems since any of the components in a virtual server can easily be replaced. For example, if a slower processing server in a virtual server is to be replaced by a faster processing server from the pool of processing servers, the control server can simply be set so that the disk and network interface that formerly communicated with the slower processing server communicate with the faster processing server instead. No physical replacement of components is necessary.

SUMMARY OF THE INVENTION

In one embodiment, a system is provided for migration of an application between processing servers in a virtual server. The system includes a first processing server, a second processing server, at least one disk for storage, at least one network interface, a control server and an agent. The control server is operable to combine the first processing server with the network interface and disk into the virtual server to operate an application. The agent is coupled to the control server to promote capture from the first processing server of application state information related to execution of the application by the first processing server. The agent further promotes transfer of at least some of the captured application state information to the second processing server to enable the second processing server to execute the application using at least some of the captured application state information.

In another embodiment, a method for migrating an application between processing servers during execution is provided. The method includes recording application-related information for an application executing on a first processing server controlled by a virtual server. The method includes transferring the application-related information for use by a second processing server controlled by the virtual server. The method provides for using the application-related information for the second processing server to execute the application.

In another embodiment, a system is provided for migration of an application between processing servers in a virtual server. The system includes a first processing server, a second processing server, at least one disk for storage, at least one network interface, a control server and an agent. The control server is operable to combine the first processing server with the network interface and disk into the virtual server to execute an application. The agent promotes transfer of execution of the application from the first processing server to the second processing server during execution of the application by capturing application state information from the first processing server and transferring the application state information for use by the second processing server. The agent is further operable to cause the first processing server to end execution of the application and to enable the second processing server to begin execution of the application substantially about where the first processing server ended execution.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
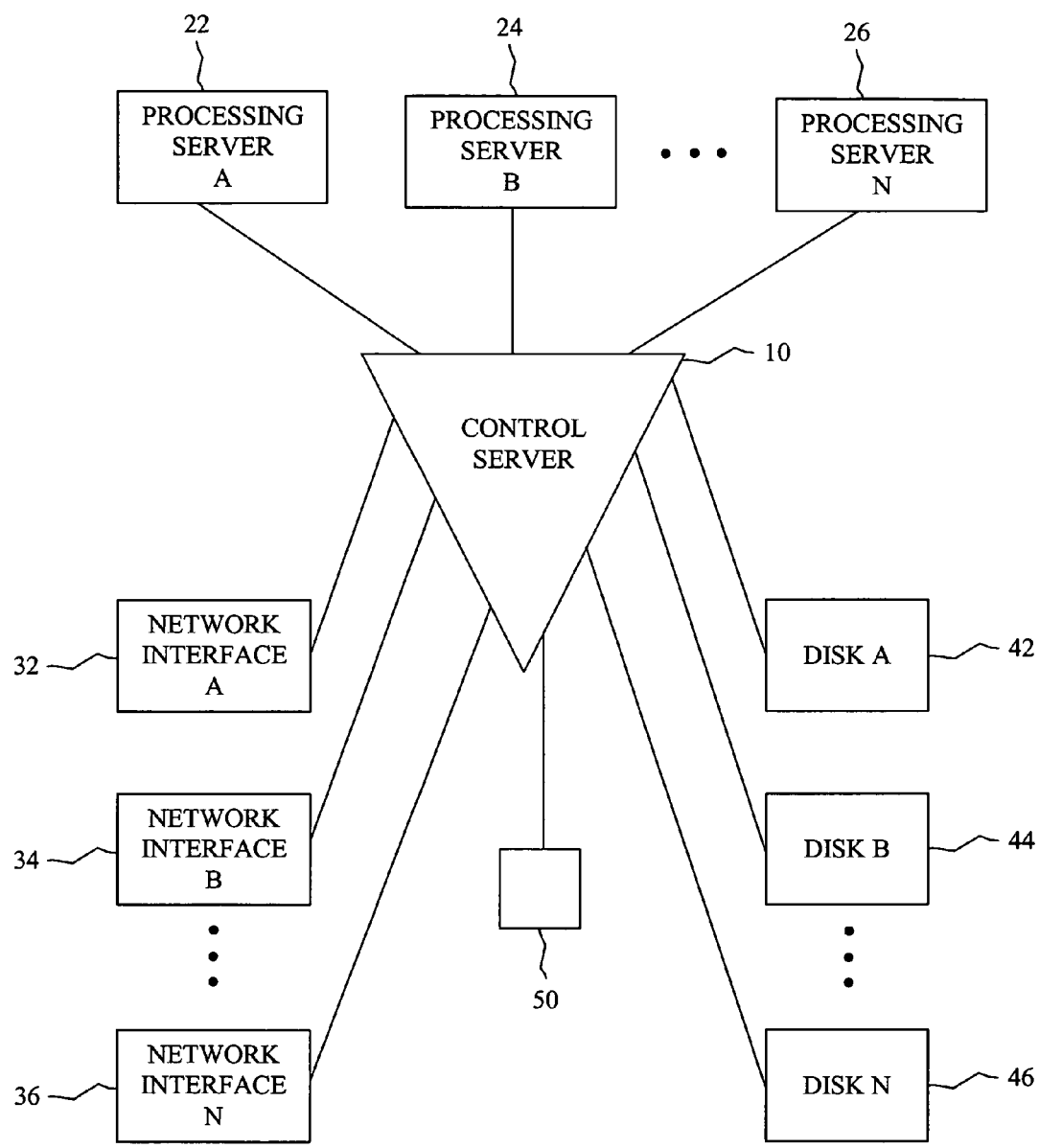
FIG. 1 illustrates a set of components that can be combined to form virtual servers according to an embodiment of the present disclosure.

FIG. 1 illustrates pools of components that might be combined through a control server 10 to form one or more virtual servers. That is, any of an indeterminate number of processing servers 22, 24, and 26; an indeterminate number of network interfaces 32, 34, and 36; and an indeterminate number of disks 42, 44, and 46 could be combined through the control server 10 to build a virtual server. For example, a virtual server might be formed through the combination of processing server A 22, network interface A 32, and disk A 42. The other processing servers 24 and 26, network interfaces 34 and 36, and disks 44 and 46 might be combined in other virtual servers or might be available for future use.

When a virtual server has been created from components such as those in FIG. 1, it may be desirable at some point to replace one of the components. For example, in a virtual server formed from processing server A 22, network interface A 32, and disk A 42, it may be necessary to replace processing server A 22 with a different processing server, processing server B 24, for instance. In such a case, the execution of any applications operating on processing server A 22 would need to be migrated to processing server B 24. The term "application" as used herein includes, but is not limited to, any software, application, operating system, other computer programs or instructions, or combinations thereof.

Traditionally, such a migration might occur by stopping all applications running on processing server A 22, shutting down the operating system on processing server A 22, and then shutting down processing server A 22. The control server 10 would then be reset so that network interface A 32 and disk A 42 are combined in a virtual server with processing server B 24 instead of processing server A 22. Processing server B 24 could then be started, the operating system for processing server B 24 could be started, and the applications that were formerly running on processing server A 22 could be started on processing server B 24. The applications may need to cease execution for several minutes while processing server A 22 is stopped and processing server B 24 is starting up. When a critical application is running, it may be undesirable to have the application out of operation for an extended length of time such as this.

Embodiments of the present disclosure provide a system and method for decreasing the amount of time needed to migrate an application from one processing server to another in a virtual server. Information related to an application executing on a first processing server is copied to a second processing server while both processing servers are in operation. The second processing server then continues the execution of the application. Only a minimal outage of application execution occurs while the migration takes place.

The system illustrated in FIG. 1 can allow a faster migration of an application from one processing server to another, according to one embodiment, by providing an agent 50 that manages the copying or movement of application-related data from one processing server to another. While the agent 50 is shown outside the control server 10, the agent 50 could also be an integral part of the control server 10. In various embodiments, the agent 50 is a software module that works in conjunction with the control server 10 and/or the operating system used by one or both of the processing servers involved in the migration process.

The data that is migrated from a source processing server to a target processing server can vary in the disclosed embodiments. In one embodiment, all or portions of the data related to an executing application is copied. This might include the data that the application is manipulating, the application's instruction set, operating system parameters that might impact the application, process tables, system tables, data related to the disk and the network interface used by the source processing server, and other information related to the state of the application. Hereafter, this data or portions of this data will be referred to as application state information.

The application state information from the source processing server might be recreated on the target processing server and the target processing server might be able to resume processing of the application. As an example, an application running on processing server A 22 might be migrated to processing server B 24. In that case, a copy of the appropriate memory locations in processing server A 22 can be made and transferred to processing server B 24. This allows the memory pointers for instructions about to be processed by processing server A 22 to be transferred to processing server B 24. The control server 10 would then be reset so that network interface A 32 and disk A 42 are combined in a virtual server with processing server B 24 instead of processing server A 22. Processing server B 24 can then resume processing at the points where those pointers and other instructions or processes were captured on processing server A 22.

Direct moves of memory from one processing server to another may cause conflicts on incompatible systems. Control server 10 and/or agent 50 may be operable to manage and adjust copied data and/or instructions to address compatibility-related issues.

Regardless of the details regarding which application state information is copied from one processing server to the other and how the recording of the application state information occurs, the migration of an application might occur in various ways, several of which are discussed below. Other ways will suggest themselves to one of skill in the art.

In one embodiment, the application is halted and the agent 50 records the application state information related to the application being migrated. The recording of the application state information might occur by the agent 50 actively retrieving the application state information from processing server A 22, by processing server A 22 sending the application state information to the agent 50 upon receiving a request from the agent 50, or by various other means. In any event, a record of pertinent application state information at a particular point in time is saved. Processing server A 22 might be shut down at this point or might be left in operation if, for example, other applications are running on it. The copied application state information is then written to processing server B 24 and processing server B 24. Again, the control server 10 would be reset so that network interface A 32 and disk A 42 are combined in a virtual server with processing server B 24 instead of processing server A 22. Processing server B24 then resumes the execution of the application.

Processing server B 24 can be placed into operation and its operating system can be booted up before the migration occurs. This allows the time needed to perform a migration in this manner to be reduced compared to the traditional migration method. In the present embodiment, the application is out of operation only for the amount of time needed for the transfer of the application state information to occur. This length of time would vary depending on the amount of application state information to be transferred, but for a typical application, the period might be in the order of seconds, such as in the range of 30 seconds.

In another embodiment, the time needed for the migration of an application from processing server A 22 to processing server B 24 can be further reduced. In this embodiment, the agent 50 again records the application state information related to the application being migrated. However, instead of the application being halted prior to the copy, it continues to execute. The copied application state information is then written to processing server B 24 as before, but the migration of the application state information occurs while the application is executing on processing server A 22. When the migration of the application state information is complete, the application is halted. Then, another recording of application state information is made. The second recording of application state information would capture only the application state information that changed since the first recording. The second recording of application state information can then be written to processing server B 24 so that processing server B 24 has a complete record of the application state information from the time of the first recording to the time the application was halted. The control server 10 would be reset so that network interface A 32 and disk A 42 are combined in a virtual server with processing server B 24 instead of processing server A 22. Processing server B 24 can then resume the execution of the application.

Since processing server A 22 continues to execute while the first migration of application state information from processing server A 22 to processing server B 24 occurs, the length of time that processing server A 22 is not in operation is reduced. In this embodiment, the application is out of operation only for the amount of time needed to migrate from processing server A 22 to processing server B 24 the changes that occurred between the first recording of application state information and the final recording of application state information. This length of time would vary depending on the number of changes that occurred, but for a typical application, the period might be in the range of a few seconds, such as 3 seconds.

The agent 50 might make modifications when incompatibilities exist between the source processing server and the target processing server. For example, the two processing servers might use different CPUs, different file systems, or have other dissimilarities. These incompatibilities might prevent an application from executing properly when it is migrated from one processing server to another. The agent 50, working in conjunction with the control server 10, might make the necessary adjustments to manage the incompatibilities. Since the control server 10 already includes software for dealing with communications among multiple disparate processing servers, disks, and network interfaces, the agent 50 may be able to leverage much of this existing functionality.

Figure 2:
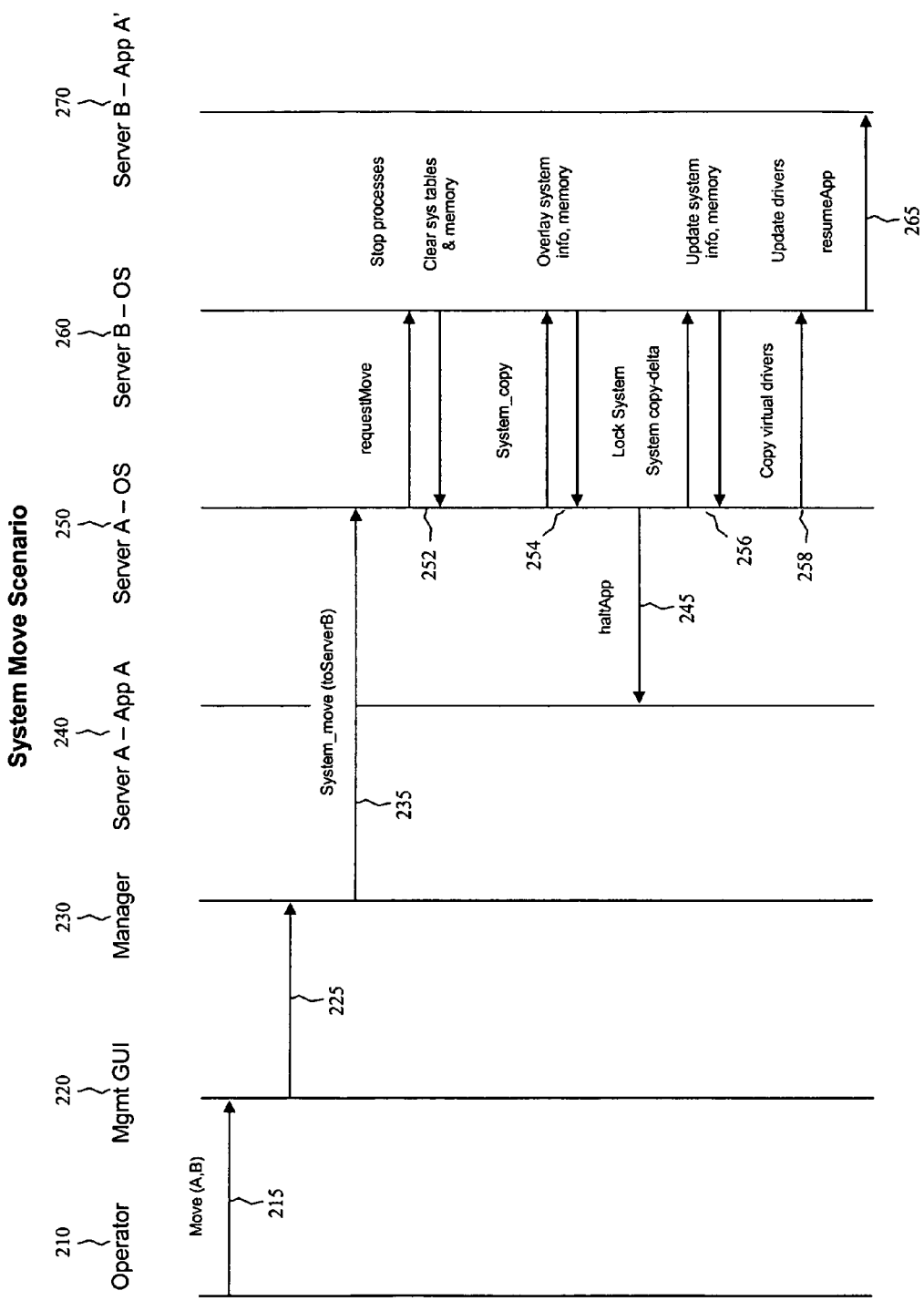
FIG. 2 illustrates a sequence diagram for the migration of an application according to an embodiment of the present disclosure.

FIG. 2 illustrates a sequence diagram of the steps that might be taken in an embodiment of the migration of an application from one processing server to another. In this example, an application that is referred to as App A 240 is being moved from a source processing server, referred to as Server A, to a target processing server, referred to as Server B. An operator 210 sends a command 215 to a management GUI 220, which may reside, for example, on the control server 10, to move App A 240 from Server A to Server B. The management GUI 220 then sends the command 225 to a manager 230. The manager 230 can perform functions similar to those performed by the agent 50 in FIG. 1. The manager 230 sends a command 235 to the operating system 250 for Server A to perform a system move from Server A to Server B.

The operating system 250 for Server A sends a command 252 to the operating system 260 for Server B to request the move of App A 240 to Server B. This can cause processes related to App A 240 to stop and can clear system tables and memory related to App A 240. The operating system 250 for Server A then sends a command 254 to the operating system 260 for Server B to do a system copy of application state information from Server A to Server B. This can overlay system information and memory-related data from Server A onto Server B. The operating system 250 for Server A then sends a command 245 to App A 240 to halt execution. App A 240 is then halted.

Next, the operating system 250 for Server A sends a command 256 to the operating system 260 for Server B to lock the system and perform a system copy delta. That is, application state information that changed between the time of the system copy 254 and the time of the system lock 256 is copied from Server A to Server B. This updates the system information and memory-related data that was previously overlaid onto Server B. The operating system 250 for Server A then sends a command 258 to the operating system 260 for Server B to copy virtual drivers from Server A to Server B. That is, information related to the drivers that manage communications among the processing server, disk, and network interface for Server A is copied from Server A to Server B. The control server 10 would be reset so that network interface A 32 and disk A 42 are combined in a virtual server with processing server B 24 instead of processing server A 22. The operating system 260 for Server B then sends a command 265 to the application, which is now referred to as App A', to resume execution on Server B.

Figure 3:
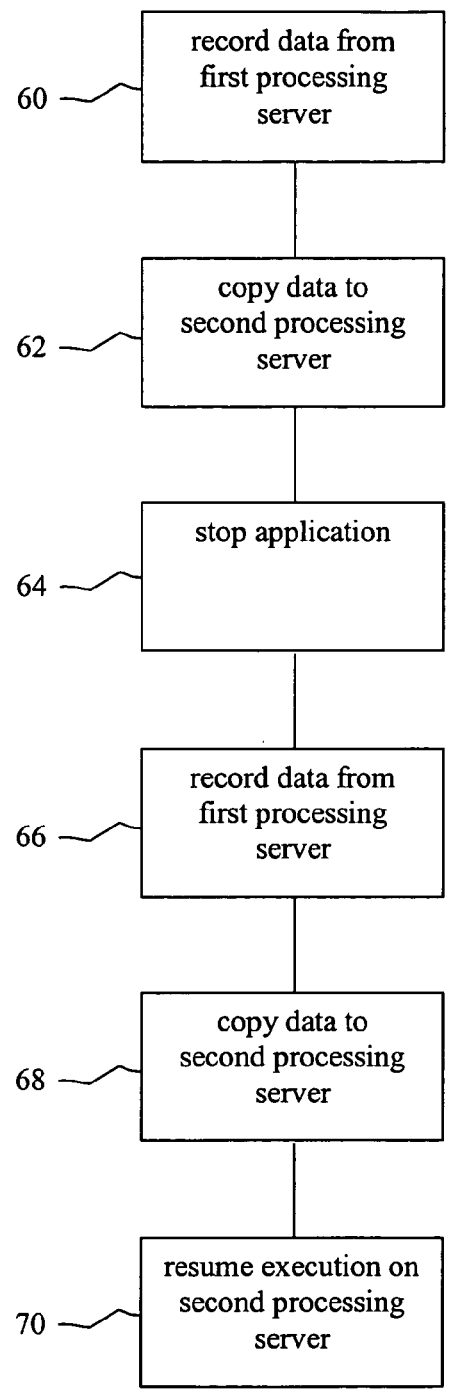
FIG. 3 is a flowchart of a method for migrating an application according to an embodiment of the present disclosure.

An embodiment of the migration of an application from one processing server to another is summarized by the flowchart in FIG. 3. In box 60, a record is made of the state of an application executing on a first processing server. In box 62, the record is copied to a second processing server. The application continues to execute while the record is copied. In box 64, the execution of the application is halted. In box 66, a second record of the state of the application is made. The second record might contain only the data that has changed since the first record was made. In box 68, the second record is copied to the second processing server. In box 70, execution of the application resumes on the second processing server.

While several embodiments have been provided in the present disclosure, it should be understood that the present disclosure may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by on skilled in the art and could be made without departing from the spirit and scope disclosed herein.

What is claimed is:

1. A system for migration of an application between processing servers in a virtual server, comprising:
   a first processing server;
   a second processing server;
   at least one disk for storage;
   at least one network interface;
   a control server that combines the first processing server with the network interface and disk into the virtual server to operate an application; and
   an agent operably coupled to the control server that promotes capture from the first processing server of application state information related to execution of the application by the first processing server, the agent further promotes transfer of at least some of the captured application state information to migrate the application from the first processing server to the second processing server and enable the second processing server to continue the execution of the application using the at least some of the captured application state information, and the agent further promotes stopping the application processing on the first processing server,
   wherein the captured application state information includes a first set of application state information that is recorded from the first processing server and is transferred for use by the second processing server while the application executes on the first processing server and while the second processing server is in operation, and a second set of application-related information captured after the first set of application state information, the second set of application state information including application state information that is recorded from the first processing server that changed since the first set of application state information was recorded and is transferred for use by the second processing server.

2. The system of claim 1, wherein the application state information is further defined as data manipulated by the application.

3. The system of claim 1, wherein the application state information is further defined as including:
   data manipulated by the application;
   the application's instruction set;
   operating system parameters;
   process tables; and
   system tables.

4. The system of claim 1, wherein the application state information is further defined as including application-related data captured from a memory component of the first processing server.

5. The system of claim 4, wherein the application state information is recorded from the memory component of the first processing server and transferred to a memory component of the second processing server while the second processing server is in operation.

6. The system of claim 1, wherein the second processing server continues the execution of the application at the point where the first processing server captured the application state information.

7. The system of claim 1, wherein the second set of state information is captured from the first processing server after stopping the application processing on the first processing server.

8. A method for migrating an application between processing servers during execution, comprising:
   recording a first set of application-related information of execution of an application on a first processing server;
   transferring the first set of application-related information to a second processing server while the second processing server is in operation;
   continuing the execution of the application by the first processing server while transferring the first set of application-related information;
   halting the execution of the application on the first processing server when transferring the first set of application-related information is complete;
   recording a second set of application-related information from the first processing server comprising application-related information that changed since the first set of application-related information was recorded;
   transferring the second set of application-related information for use by the second processing server; and
   continuing the execution of the application on the second processing server using the first and second sets of transferred application-related information.

9. The method of claim 8, wherein the application-related information includes data manipulated by the application.

10. The method of claim 9, wherein the application-related information includes:
    data manipulated by the application;
    the application's instruction set;
    operating system parameters;
    process tables;
    system tables; and
    data related to the disk and the network interface.

11. The method of claim 8, wherein the execution of the application by the first processing server is halted before the second set of application-related information is recorded.

12. The method of claim 8, wherein the execution of the application by the first processing server is halted after the first set of set of application-related information is recorded and before the second set of application-related information is recorded.

13. The method of claim 8, wherein the second processing server continues the execution of the application at the point where the first processing server recorded the second set of application state information.

14. A system for migration of an application between processing servers in a virtual server, comprising:
    a first processing server;
    a second processing server;
    at least one disk for storage;
    at least one network interface;
    a control server that combines the first processing server with one of the at least one network interface and one of the at least one disk into the virtual server to execute an application; and
    an agent that promotes migration of execution of the application from the first processing server to the second processing server during the execution of the application by capturing application state information from the first processing server and transferring the application state information for use by the second processing server while the second processing server is in operation, the agent further causes the first processing server to end the execution of the application and to enable the second processing server to continue the execution of the application about where the first processing server ended the execution of the application,
wherein the control server combines the one of the at least one network interfaces and the one of the at least one disk for storage into the virtual server with the second processing server instead of the first processing server to continue the execution of the application subsequent to transferring the application state information.

15. The system of claim 14, wherein the application state information is further defined as data manipulated by the application.

16. The system of claim 14, wherein the application state information is further defined as including:
    data manipulated by the application;
    the application's instruction set;
    operating system parameters;
    process tables; and
    system tables.

17. The system of claim 14, wherein the application state information is further defined as including application related data captured from a memory component of the first processing server.

18. The system of claim 17, wherein the application state information is recorded from the memory component of the first processing server and transferred to a memory component of the second processing server while the second processing server is in operation.

19. The system of claim 14, wherein the application state information is further defined as captured at least partially from a memory component of the first processing server.

20. The system of claim 14, wherein the captured application state information includes a first set of application state information that is recorded from the first processing server and is transferred for use by the second processing server while the application executes on the first processing server, and a second set of application-related information captured after the first set of application state information, the second set of application state information including application state information that is recorded from the first processing server that changed since the first set of application state information was recorded and is transferred for use by the second processing server.

* * * * *